United States Patent [19]

Sonohara et al.

[11] Patent Number: 5,630,036
[45] Date of Patent: May 13, 1997

[54] IMAGE DATA COMPRESSION METHOD INVOLVING DELETING DATA IN AREAS WHERE PREDICTED COLOR VALUE, BASED ON COLOR CHANGE BETWEEN ADJACENT PIXELS, IS SMALL, AND IMAGE DATA PROCESSING DEVICE IMPLEMENTING SAME METHOD

[75] Inventors: Satoshi Sonohara; Shigeki Furuta; Hitoshi Matsumoto, all of Kawasaki; Motoyuki Morita, Tokyo, all of Japan

[73] Assignee: Fujitsu Limited, Kawasaki, Japan

[21] Appl. No.: 101,698

[22] Filed: Aug. 4, 1993

[30] Foreign Application Priority Data

Nov. 2, 1992 [JP] Japan .................................. 4-294657

[51] Int. Cl.$^6$ .................................................. G06T 9/00
[52] U.S. Cl. .................... 395/131; 312/162; 312/232
[58] Field of Search ...................... 395/118, 129–132, 395/114; 348/394, 399, 400, 401; 358/430, 431; 382/56

[56] References Cited

U.S. PATENT DOCUMENTS

| | | | |
|---|---|---|---|
| 4,776,029 | 10/1988 | Shimura | 382/56 |
| 4,992,860 | 2/1991 | Hamasuchi et al. | 358/431 |
| 5,007,102 | 4/1991 | Haskell | 382/238 |
| 5,172,237 | 12/1992 | Blonstein et al. | 382/56 |
| 5,247,589 | 9/1993 | Faul et al. | 382/56 |
| 5,317,428 | 5/1994 | Osawa et al. | 382/238 |
| 5,379,355 | 1/1995 | Allen | 382/56 |

*Primary Examiner*—Almis R. Jankus
*Attorney, Agent, or Firm*—Staas & Halsey

[57] ABSTRACT

An image data compression method in which reductions in data amount are achieved by deleting some pixel data. Compression is achieved by performing a reading step to read an image as plural pixel data and a deleting step to delete some of the pixel data. A prediction error calculating step calculates a prediction error that represents the difference between the color value pixel data of a pixel in question and the predicted color value thereof, as predicted by a prescribed prediction method from the pixel data of a pixel adjacent thereto. An area classifying step classifies the pixel data of the entire image area into either an abrupt color change areas type in which the prediction error is large or a nonabrupt color change area in which the prediction error is small. The deleting step is performed only on the pixel data classified in the nonabrupt color change area; deleted-position information is appended to the non-deleted pixel data that indicates the position of a pixel whose data has been deleted. This improves the quality of reproduction, since no pixel data are deleted where large errors would be expected to occur in reproduction.

25 Claims, 9 Drawing Sheets

| | | | | | | | | |
|---|---|---|---|---|---|---|---|---|
| P11 | P12 | P13 | P14 | P15 | P16 | P17 | P18 | P19 |
| (4,7,3) | (2,4,1) | (1,3,1) | (2,7,1) | (4,4,2) | (4,4,2) | (3,4,2) | (5,6,4) | (5,7,4) |
| P21 | P22 | P23 | P24 | P25 | P26 | P27 | P28 | P29 |
| (2,5,2) | (1,3,1) | (1,3,1) | (2,3,2) | (2,4,2) | (2,4,2) | (1,3,1) | (2,2,1) | (2,3,2) |
| P31 | P32 | P33 | P34 | P35 | P36 | P37 | P38 | P39 |
| (8,8,7) | (8,8,7) | (9,9,8) | (10,10,9) | (11,10,9) | (12,11,9) | (10,10,8) | (8,8,6) | (6,7,6) |
| P41 | P42 | P43 | P44 | P45 | P46 | P47 | P48 | P49 |
| (8,9,8) | (8,9,8) | (9,10,9) | (8,9,9) | (9,9,9) | (9,10,9) | (10,11,10) | (9,12,10) | (9,11,9) |

DP(x, y, z): 0 DESIGNATES DATA DELETED POSITION

| 1 | 1 | 1 | 1 | 1 | 1 | 1 | 1 |
|---|---|---|---|---|---|---|---|
| 1 | 1 | 0 | 1 | 1 | 0 | 1 | 1 |
| 1 | 0 | 1 | 0 | 1 | 0 | 1 | 1 |
| 1 | 0 | 1 | 0 | 1 | 0 | 1 | 0 |

| P11 | P12 | P13 | P14 | P15 | P15 | P17 | P18 | P19 |
|-----|-----|-----|-----|-----|-----|-----|-----|-----|
| P21 | P22 | P23 | P23 | P25 | P25 | P27 | P27 | P29 |
| P31 | P31 | P33 | P33 | P35 | P35 | P37 | P38 | P39 |
| P41 | P41 | P43 | P43 | P45 | P45 | P47 | P47 | P49 |

IMAGE DATA COMPRESSION METHOD INVOLVING DELETING DATA IN AREAS WHERE PREDICTED COLOR VALUE, BASED ON COLOR CHANGE BETWEEN ADJACENT PIXELS, IS SMALL, AND IMAGE DATA PROCESSING DEVICE IMPLEMENTING SAME METHOD

BACKGROUND OF THE INVENTION

1. Field of the Invention

The present invention relates to an image data compression method and an image data processing device implementing the same; more particularly, the invention relates to an image data compression method in which reductions in data amount are achieved by deleting portions of pixel data and to an image data processing device implementing the same.

2. Description of the Related Art

Generally, an image processing system comprises an image data input device for inputting an image to be processed by converting it into digital data, a data processing device for performing processing such as recognition, analysis, manipulation, etc. on the input image data, and an image data output device for outputting the thus processed image data.

Such a system employs a technique of data compression so that sampled image data can be processed efficiently. Data compression is a method of reducing a large volume of original image data into a smaller amount of data. In data compression, it is a condition that an image which is close to an original image can be produced from a small amount of compressed data, and it is desirable that the compression rate be made as large as possible while yet allowing the production of an image as close to the original image as possible.

In one known method of data compression, pixel data that constitute an image are selectively deleted according to a prescribed rule, for example, every other pixel, every two pixels, and so on. If the pixel data are selectively deleted every other pixel, the amount of image data would be reduced to one-half the original data amount and, if the data are deleted for two pixels in every three pixels, the amount of image data would decrease to one-third the original data. In reconstructing the original image from the thus compressed image data, either a neighboring pixel data portion is copied and made to represent a deleted data portion or a technique of interpolation is used in which each deleted portion of data is the average of the pixel data portions neighboring it, assuming that the data changes linearly between them.

However, the above image data compression method that involves deletion of data according to a prescribed rule has the following problems. For example, in the former case in which each deleted portion of pixel data is approximated just by copying the pixel data neighboring on one side of it, if the neighboring pixel data is truncated in an area where the value of pixel data abruptly changes, the information that represents the abrupt change will also be deleted, so that the abrupt change will not be reflected in the reproduced image, thus degrading the quality of reproduction. This is also true of the latter-above case in which deleted pixel data portions are approximated by the pixel data neighboring on both sides thereof assuming that the data changes linearly between them; that is, when the difference between the actual value and the value approximated by the neighboring pixel data is large, the reproduced image quality will degrade. As would be expected, these problems occur where abrupt changes in image data are encountered. In a color image, a change in image data manifests itself in a change in hue, luminosity, and saturation. These changes may sometimes be referred to, collectively, as a color change, and the term "color change" will be used throughout this specification as a term that broadly refers to the change of color including changes in luminosity and saturation.

SUMMARY OF THE INVENTION

An object of the present invention is to improve the quality of image reproduction in an image data compression method involving deleting portions of pixel data, and to provide an image data processing device implementing such a method.

According to the present invention, there is provided an image data compression method that comprises: a reading step in which an image is read as plural pixel data; a prediction error calculating step in which a prediction error is detected that represents the difference between the actual pixel value and the predicted color value predicted by a prescribed prediction method from the pixel data of an adjacent pixel; an area classifying step in which the entire image area is classified into an abrupt color change area where the prediction error is large and a nonabrupt color change area where the prediction error is small; a deleting step in which some of the pixel data in an area classified in the area classifying step as the nonabrupt color change area are deleted; and a deleted-position information appending step in which deleted-position information that indicates the position of a pixel whose data has been deleted is appended.

According to the image data compression method of the invention, a prediction error is calculated which represents the difference between the actual pixel data and the predicted color value predicted by a prescribed prediction method that matches the method of reproduction employed, and the entire image area is classified into abrupt color change areas where the prediction error is large and nonabrupt color change areas where the prediction error is small. The abrupt color change areas are areas where, if portions of pixel data therein were deleted, reproduction errors would become large if the deleted pixel data were calculated from neighboring pixel data by the reproduction method that matches the prediction method. Therefore, in the present invention, the pixel data of the pixels lying in the nonabrupt color change areas are selectively deleted, while the pixel data of the pixels in the abrupt color change areas are left unchanged. This serves to improve the quality of reproduction.

DESCRIPTION OF THE PREFERRED EMBODIMENTS

Figure 1:
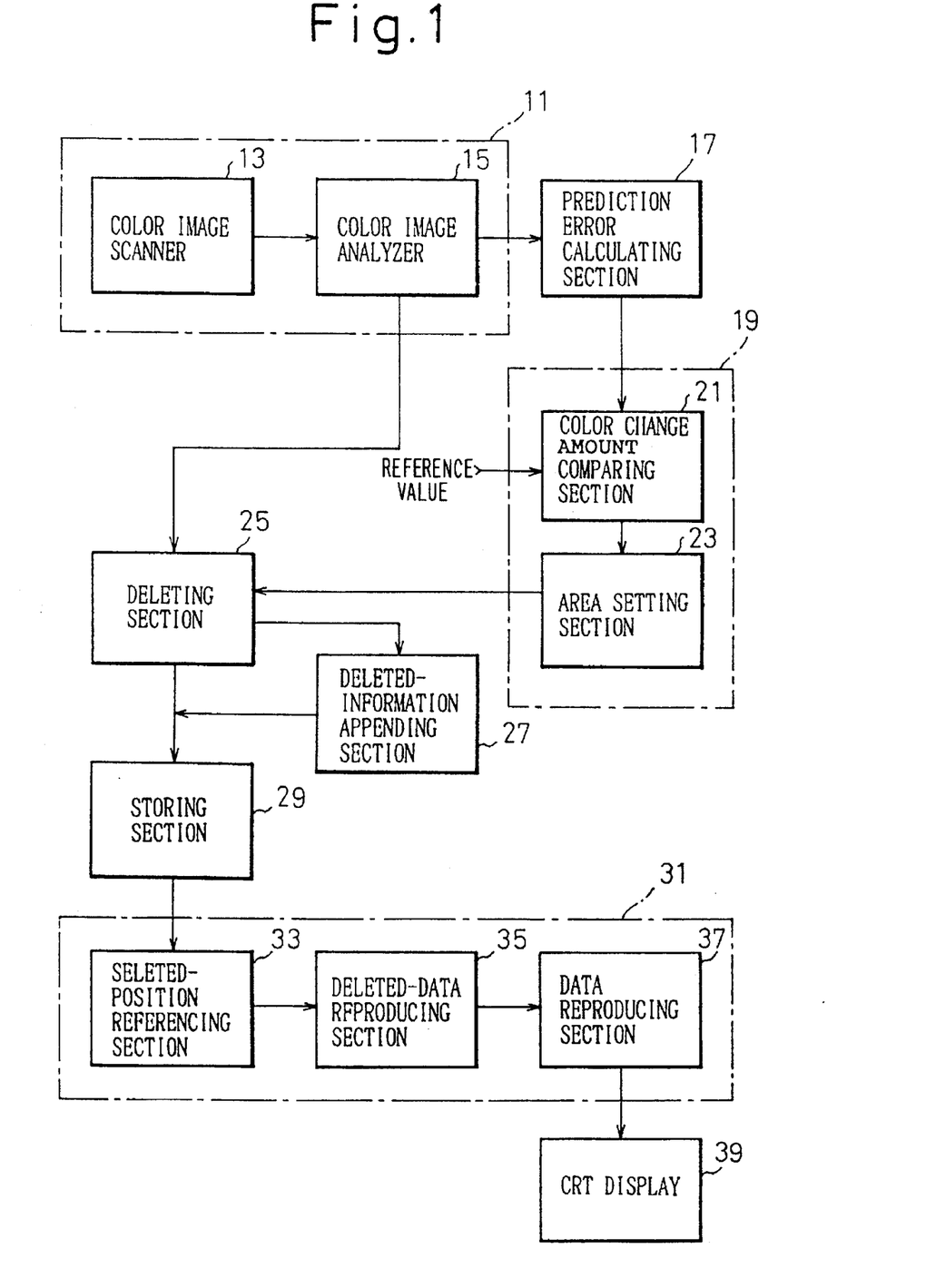
FIG. 1 is a diagram showing the configuration of an image data processing device used in the embodiments of the present invention.

FIG. 1 is a block diagram showing the configuration of an image data processing device used in the preferred embodiments of the invention. In the figure, the component elements having like functions are designated by the same reference numerals.

In FIG. 1, the reference numeral 11 designates an image data input section, consisting of a color image scanner 13 and a color image analyzer 15, for reading an image as plural pixel data. The color image analyzer 15 decomposes the color image signal captured by the color image scanner 13 into three primary color signals, R, G, and B, on a pixel-by-pixel basis, and converts each of the R, G, and B signals to a 5-bit digital signal. The numeral 17 indicates a prediction error calculating section for calculating a prediction error that represents the difference between the actual pixel data color value and the predicted value thereof based on neighboring pixel data. The numeral 19 denotes an area classifying unit, consisting of a color change amount comparing section 21 and an area setting section 23, for classifying the entire image area into abrupt color change areas where the prediction error is large and nonabrupt color change areas where the prediction error is small. The numeral 25 is a deleting section for deleting some of the pixel data within the nonabrupt color change area, and 27 is a deleted-position information appending section for appending to image data the information indicating the position of the pixel data deleted by the deleting section 25. The numeral 29 designates a storage section for storing the deleted-position information along with the pixel data which passes undeleted through the deleting section 25. The numeral 31 indicates a reproducing section for reproducing the image data by reading it from the storage section 29, the reproducing section 31 consisting of a deleted-position referencing section 33, a deleted-data reproducing section 35, and a data reproducing section 37. The numeral 39 is a CRT display for displaying the reproduced image. The reproducing section 31 and the CRT display 39 are used for reproduction of the image and are not included in the image data compression device; however, image compression and reproduction are closely related to each other, and the following description of the preferred embodiments will deal with image reproduction as well. In FIG. 1, all parts except the color image scanner 11 and CRT display 39 are implemented using computers, and all parts except the storage section 29 are implemented in software.

The color image scanner 13, the color image analyzer 15, the storage section 29, and the CRT display 39 are components that are widely used in general, and their structures are well known and therefore not specifically explained herein. Furthermore, the image compression method designed to reduce the amount of data by deleting part of pixel data according to a prescribed rule is generally practiced, and the method of reproduction designed to reproduce the image data processed by such an image compression method is also well known. The present invention assumes the use of a method of reproduction which is fundamentally the same as the known method; therefore, detailed description of the reproducing section 31 is not given here, and only differences from the known method in relation to the present invention will be described later when we deal with reproduction processes in accordance with the specific embodiments.

When compressing data by deleting some of pixel data by using the image data processing device of FIG. 1, the method of data compression assumes the use of a predetermined method for reproduction of the compressed image data. That is, the method of compression assumes the use of, for example, a method wherein pixel data adjacent on one side of deleted pixel data is taken to represent the deleted pixel data, or a method wherein the intermediate or mean value between the respective pixel data adjacent on the opposite sides of deleted pixel data is taken to represent the deleted pixel data. In the image data compression method of the present invention, the predicted color value of the pixel data, when reproduced by the predetermined reproduction method, is calculated and compared with the actual color value of the pixel data to obtain the error, and if the error is large, the pixel data will not be deleted. To achieve this purpose, the prediction error calculating section 17 calculates the predicted color value of each pixel data output from the color image analyzer 15, the predicted color value corresponding to the color value that would be obtained when the pixel data were reconstructed from adjacent pixel data in accordance with a predetermined reproduction method. Therefore, the method of predicted value calculation by the prediction error calculating section 17 may vary according to the method of reproduction employed.

The color change amount comparing section 21 compares the prediction error output from the prediction error calculating section 17 with a reference value on a pixel-by-pixel basis, and outputs the result of the comparison. Based on the result of the comparison supplied from the color change amount comparing section 21, the area setting section 23 classifies each pixel as belonging to an abrupt color change area if the prediction error is larger than the reference value or as belonging to a nonabrupt color change area if the amount of color change is smaller than the reference value. If this reference value is made larger, the sizes of the abrupt color change areas decrease, and if the value is made smaller, the sizes of the nonabrupt color change areas decrease. The reference value should therefore be determined according to the processor power and memory capacity of the image processing system and the reproduction quality required.

In the deleting section 25, out of the pixel data supplied from the color image analyzer 15, the pixel data that have been classified by the area setting section 23 as belonging to the nonabrupt color change areas are selectively deleted according to a predetermined rate of deletion. The rule for deletion needs to be predetermined in association with the reproduction process. For example, the rate of deletion is predetermined so that data are deleted every other pixel or every two pixels; the pixel data within the nonabrupt color change areas are selectively deleted at this rate. The ratio of the data to be deleted to the data not to be deleted may be set, for example, at 1:2 or other appropriate value. Alternatively, the rule may be such that pixel data only at predetermined positions are deleted; for example, in the matrix array of pixels, the pixel data may be deleted only for the pixels in the even-numbered columns. This latter arrangement is easier to process, and requires a smaller amount of information to indicate the positions of deleted pixel data, as will be described later. In the preferred embodiments described herein, the pixel data only for the pixels in the even-numbered columns in the pixel array will be deleted. Deletion means that the deleted data will be not stored in memory. In the present invention, some of the pixel data in the nonabrupt color change areas will not be stored in memory since the amount of information is small in those areas; on the other hand, all pixel data in the abrupt color change areas will be stored in memory since the data in those areas contains a large amount of information.

After some of the pixel data have been deleted by the pixel deleting section 27, the resulting image data is output as compressed data which is stored in the storage section 29. In storing the data, it is necessary to append information that indicates which pixel data at which position has been deleted. In the prior art data compression method in which pixel data is deleted at regular pixel intervals, the position of the pixel data deleted is known beforehand, and therefore, it is not necessary to append such information. In the present invention, on the other hand, since the pixel data only within the nonabrupt color change areas are selectively deleted according to a predetermined rule, information indicating which pixel data belongs to the nonabrupt color change area will become necessary when reproducing the data. The deleted-position information appending section 27 appends this information to the image data to be stored.

There are several methods of indicating the position of deleted pixel data. One method will be to use a table in which the pixels are mapped in corresponding relationship to the pixel array, and put an index at each pixel position in the table to indicate whether the pixel data at that position has been deleted or not. In cases in which pixel data at predetermined positions are to be deleted, the table need only be organized to hold contents corresponding to the pixels to be dropped, in which case it is only necessary to indicate in the table the positions of the pixels actually deleted. This serves to reduce the data amount. Another method will be to append to each stored pixel data an index that indicates whether its neighboring pixel data has been deleted or not.

A description will now be given of the embodiments wherein image processing is performed using the image data processing device shown in FIG. 1.

Figure 2:
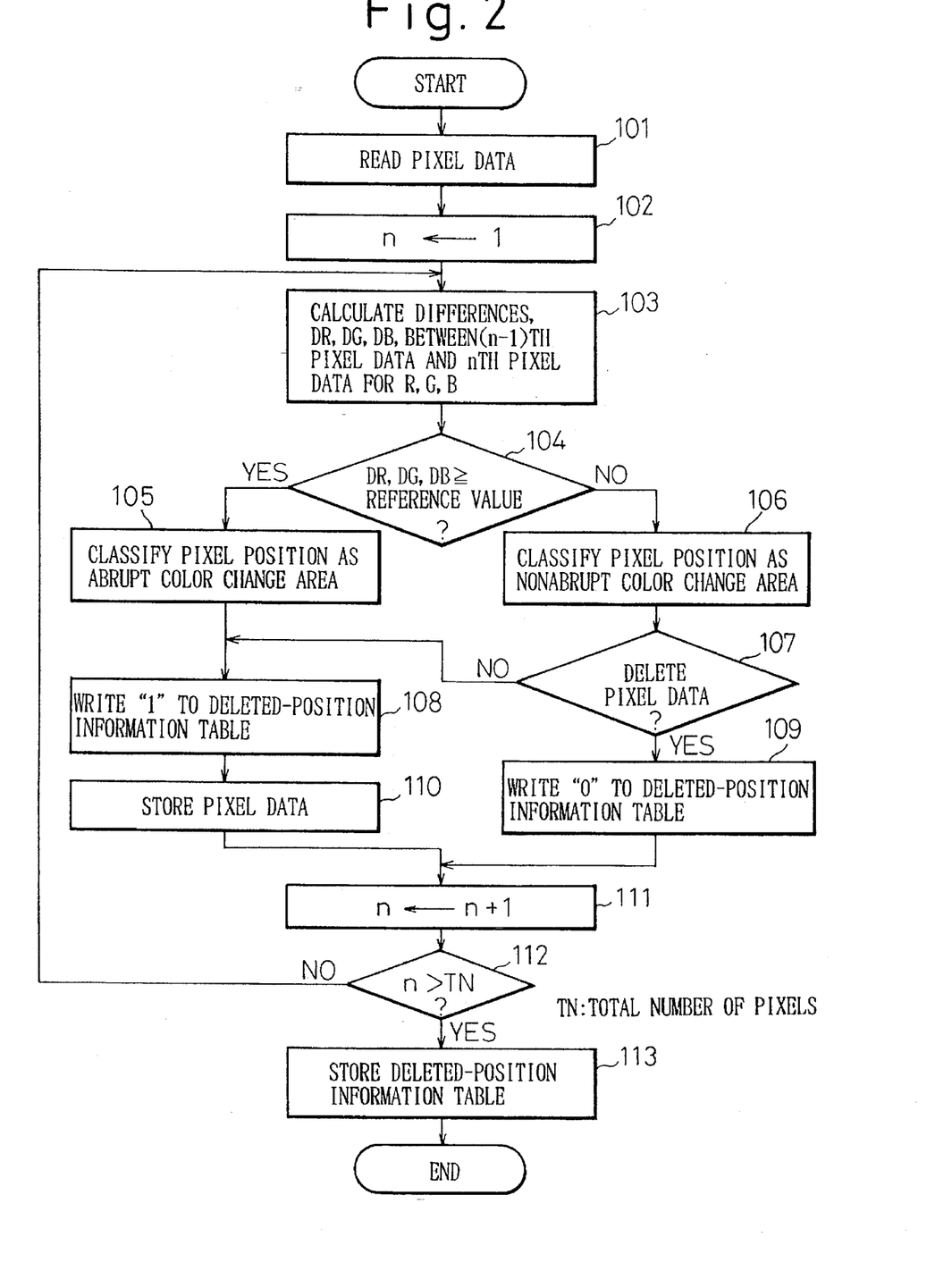
FIG. 2 is a flowchart illustrating an image data compression process according to a first embodiment of the invention.

FIG. 2 is a flowchart illustrating an image data compression process according to a first embodiment of the invention. FIGS. 3A to 3D are diagrams showing the pixel data processing results at various stages of the image data compression process according to the first embodiment. In the first embodiment, pixel data for each deleted pixel is reconstructed just by copying the pixel data of a pixel adjacent on one side of the deleted pixel, and as information to indicate the position of deleted pixel data, an index is inserted in the position of each of the pixels mapped in a table in corresponding relationship to the pixel array, the index being used to indicate whether the pixel data of the pixel has been deleted or not. This embodiment also assumes that pixel data only in the even-numbered columns are selectively deleted.

In step 101, an image is read as pixel data and converted to 5-bit data representing each of the three primary colors, R, G, and B. When the input data is already converted to RGB digital data, there is no need to provide the color image scanner 13 and the color image analyzer 15. The pixel data input in this step are assumed to have the values shown in FIG. 3A, where Pij indicates the pixel data and the values in parentheses represent the values of R, G, and B, respectively.

In step 102, "1" is placed into register n.

In step 103, the prediction error calculating section 17 calculates the differences DR, DG, and DB for R, G, and B between the (n−1)th and the nth pixel data. Since the pixel data to be deleted are limited to the data in the even-numbered columns, as described above, the processing in step 103 may be performed only on the data in the even-numbered columns. FIG. 3B shows the difference data DPij obtained by performing the processing in step 103 on the pixel data in the even-numbered columns in FIG. 3A. The values in parentheses denote the differences for R, G, and B, respectively.

In step 104, the color change amount comparing section 19 evaluates each difference data DPij calculated in step 103 and determines whether all the absolute values of the differences for R, G, and B are within a reference value. If the absolute value of any one of the differences for R, G, and B is larger than the reference value, then the operation proceeds to step 105. If all the absolute values of the differences are within the reference value, the operation proceeds to step 106. In the pixel data shown in FIG. 3B, if the reference value is set at 1, for example, there are five pixels, DP12, DP14, DP18, DP22, and DP38, that have at least one difference that exceeds the reference value.

In step 105, the area setting section 23 classifies the pixel data as one belonging to the abrupt color change areas, and the operation then proceeds to step 108. On the other hand, in step 106, the area setting section 23 classifies the pixel data as one belonging to the nonabrupt color change areas. When the pixel data is classified as one belonging to the nonabrupt color change areas in step 106, the pixel data is further evaluated in the deleting section 25 to determine whether the pixel data is from an even-numbered column that should be considered for deletion. If the pixel data is from an odd-numbered column, the data is not to be deleted even if it belongs to the nonabrupt color change area; therefore, the operation proceeds to step 108. If the pixel data is from an even-numbered column, then the operation proceeds to step 109.

In step 108, since it has been decided not to delete the pixel data, the deleted-position information appending section 27 writes "1" to the deleted-position information table. In the next step 110, the pixel data is stored in the storage section 29, and the operation proceeds to step 111. At this time, since the rule is such that the pixel data in the odd-numbered columns are not deleted, the positions of the pixel data in the odd-numbered columns may be prewritten with "1".

In step 109, since it has been decided to delete the pixel data, the delete-position information appending section 27 writes "0" to the deleted-position information table, after which the operation proceeds to step 111.

Figure 3A:
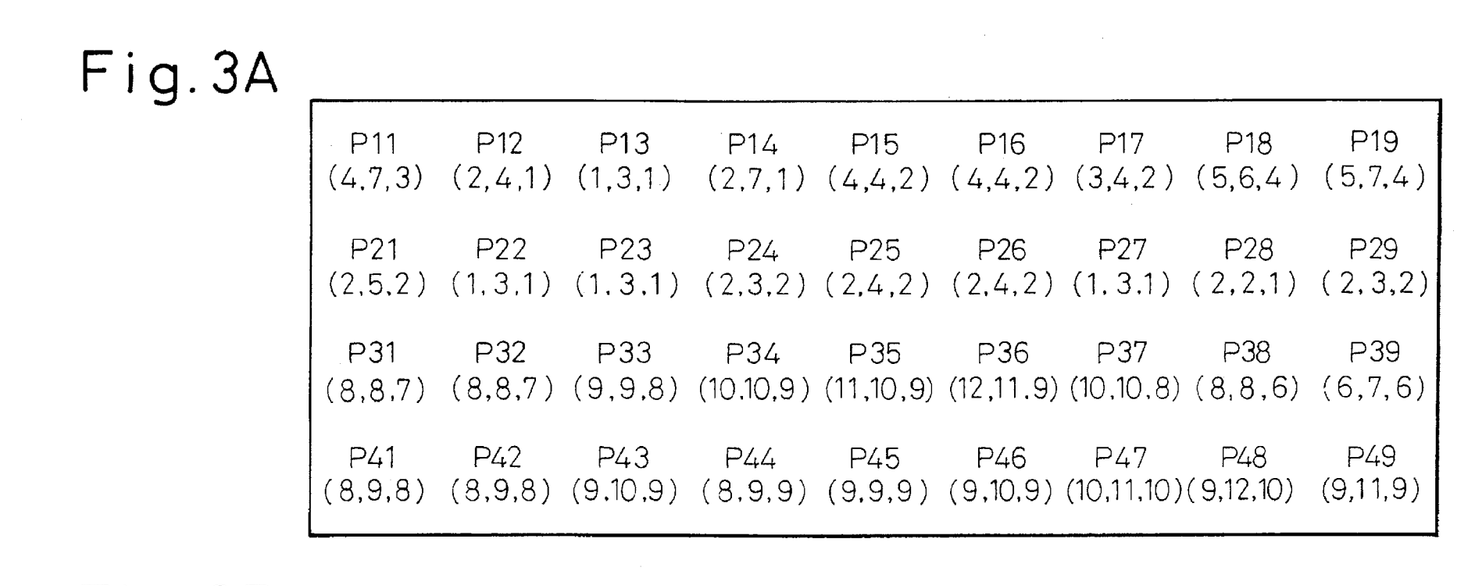
FIGS. 3A to 3D are diagrams showing how image data is processed by the image data compression process according to the first embodiment.
Figure 3B:
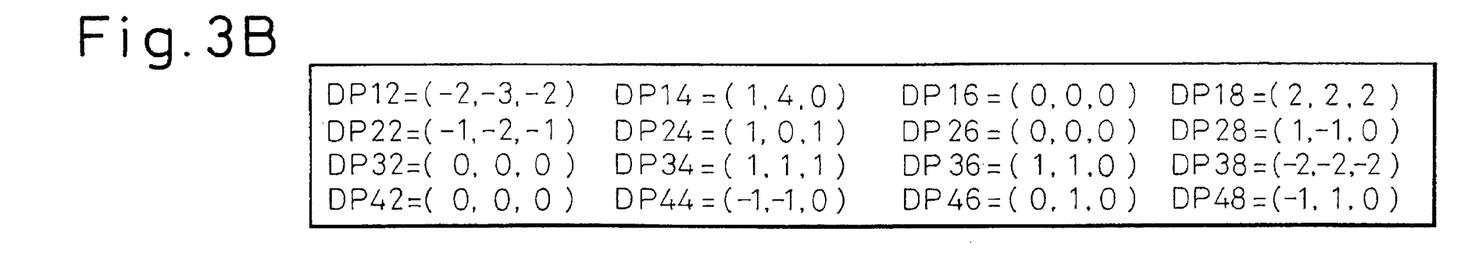
Figure 3C:
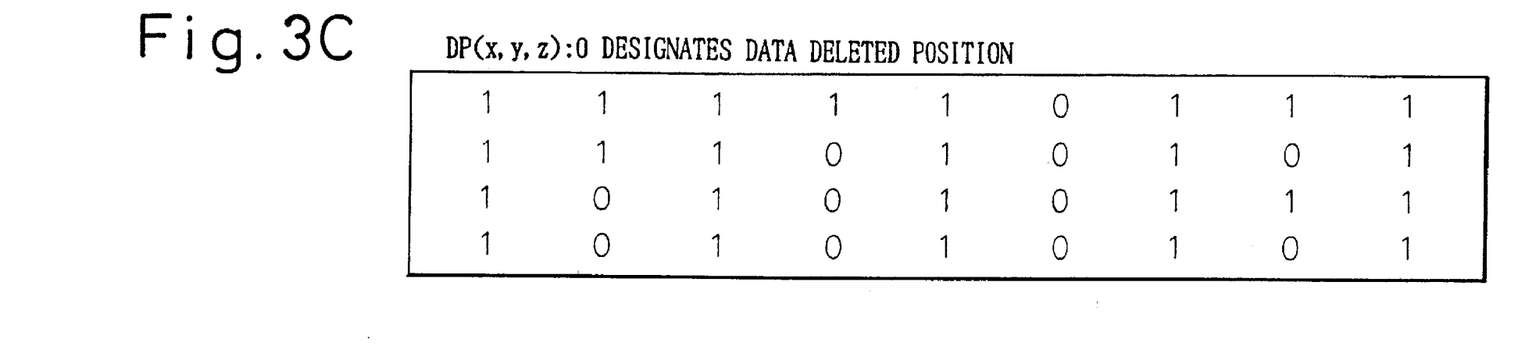

FIG. 3C shows the contents of the deleted-position information table created from the data shown in FIG. 3B. The table shows that data for 11 pixels have been deleted.

In step 111, the value of the register n is incremented by 1, and in step 112, a decision is made as to whether the value of the register n is larger than the total number of pixels TN, to determine whether all the pixel data have been processed.

After the decision to delete or not has been made for every pixel data and the pixel data not deleted have been stored accordingly, the deleted-position information table holding the contents as shown in FIG. 3C is stored before terminating the process.

Figure 3D:
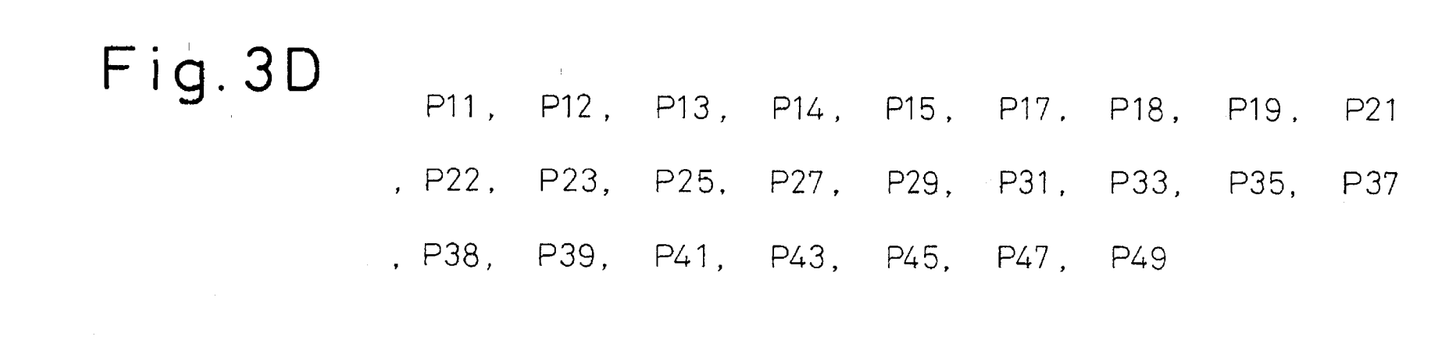

In the illustrated example, pixel data for 25 pixels have been stored, as shown in FIG. 3D, as a result of the above processing. The data are stored in the order shown.

Figure 4:
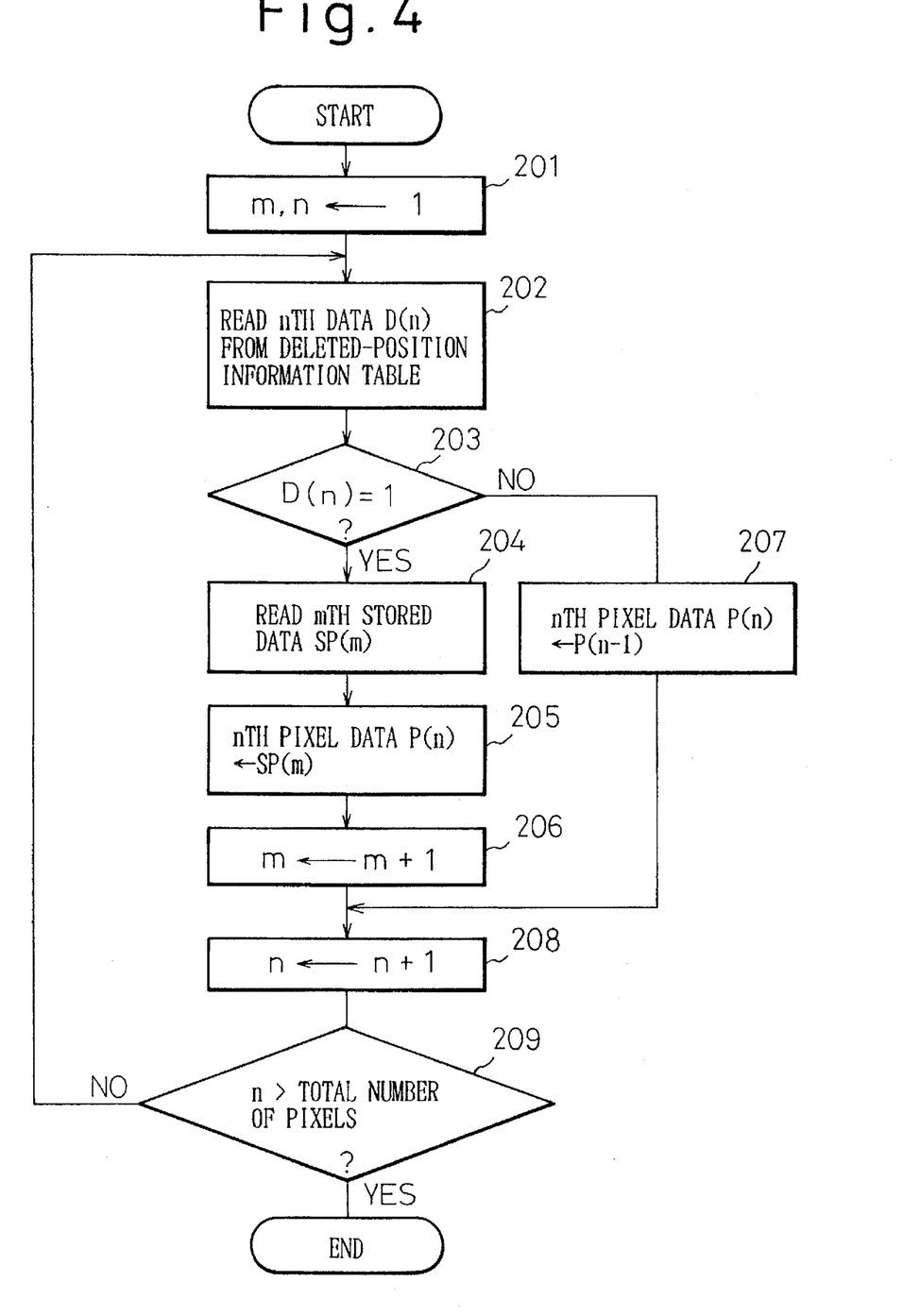
FIG. 4 is a flowchart illustrating a procedure for reproducing the image data from the data compressed by the image data compression process in FIG. 2 according to the first embodiment.

FIG. 4 is a flowchart illustrating a procedure for reproducing the image data from the data compressed and stored as described above. The data reproduction process will be described below with reference to FIG. 4.

In step 201, "1" is placed in registers m and n, the value in m denoting the order in which the stored pixel data are to be read out, and the value in n representing the order in which the pixel data are to be reproduced.

In step 202, the nth data D(n) in the deleted-position information table is read out.

In step 203, the readout nth data D(n) is checked to determine whether it is "1" or not.

If it is "1", it indicates the corresponding pixel data has not been deleted. Therefore, in step 204, the mth stored pixel data SP(m) is read out, and in step 205, the pixel data SP(m) is taken as reproduced pixel data P(n). Then, in step 206, the register m is incremented by 1.

If D(n) is "0", then in step 207 the previous reproduced pixel data P(n-1) is just copied and made to represent the nth reproduced pixel data P(n); the operation then proceeds to step 208.

In step 208, the register n is incremented by 1. In the next step 209, a decision is made as to whether n is larger than the total number of pixels; if n is not larger, the operation returns to step 202, and the above processing is repeated until all the pixels have been reproduced.

Figure 5:
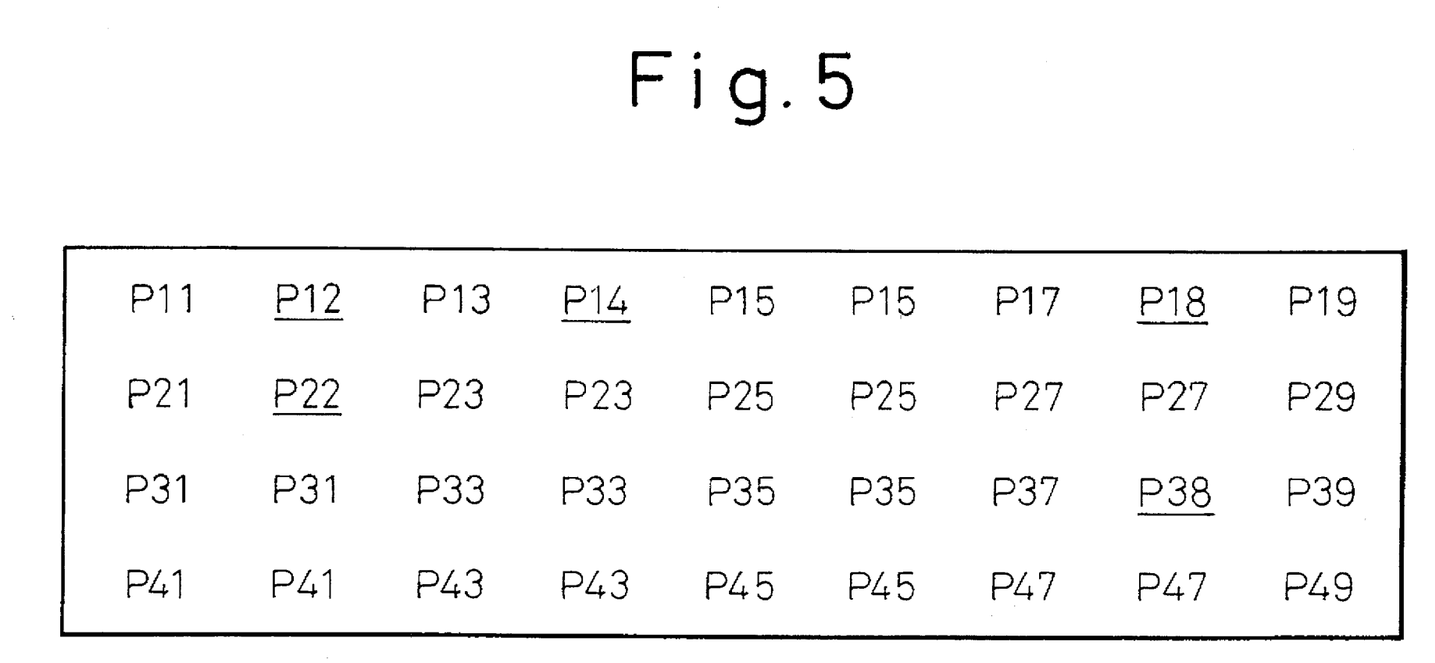
FIG. 5 is a diagram showing the reproduction result of the data shown in FIG. 3A according to the first embodiment.

FIG. 5 shows the result of data reproduction when the data obtained by compressing the pixel data shown in FIG. 3A are reproduced by the above reproduction process.

In FIG. 5, the underlined pixel data are the ones that make difference in reproduction between the present embodiment and the prior art data compression method that involves simply copying previous pixel data. As can be seen from FIG. 3A, if the underlined pixel data were represented by the previous pixel data, the difference from the actual data would be large, and it would not be possible to reproduce the change between the pixels satisfactorily.

The compression and reproduction processes of the first embodiment have been described by taking the pixel data shown in FIG. 3A as an example. It should be noted, however, an actual image consists of a far greater number of pixels and contains many successive areas where the color change is small; therefore, even if data is compressed by selectively deleting data only in the nonabrupt color change areas, a great reduction in the data amount can be achieved.

The following describes a second embodiment of the invention, wherein the reproduction method and the deleted-position information table are different from those employed in the first embodiment. In the first embodiment, deleted data is reconstructed just by copying the pixel data adjacent to the left of it; on the other hand, in the second embodiment, the mean of the respective pixel data adjacent of both sides of the deleted pixel data is taken to represent the deleted pixel data. Furthermore, in the first embodiment, an index indicating whether or not the pixel data has been deleted is appended as deleted-position information to the position of each of the pixels mapped in the table; by contrast, in the second embodiment, an index indicating whether or not the next pixel data has been deleted is appended, as deleted-position information, to each pixel data stored.

Figure 6:
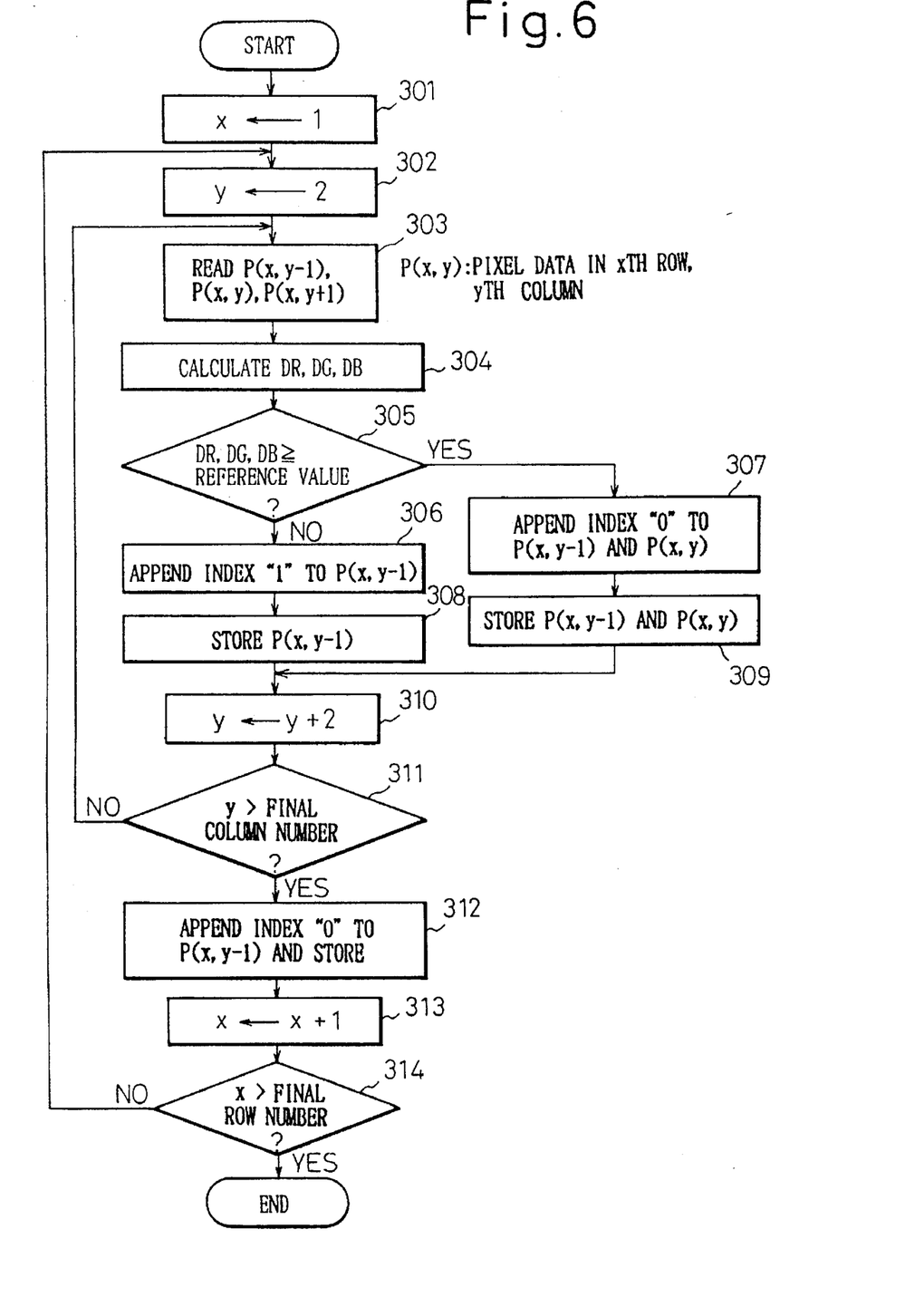
FIG. 6 is a flowchart illustrating an image data compression process according to a second embodiment of the invention.
Figure 7A:
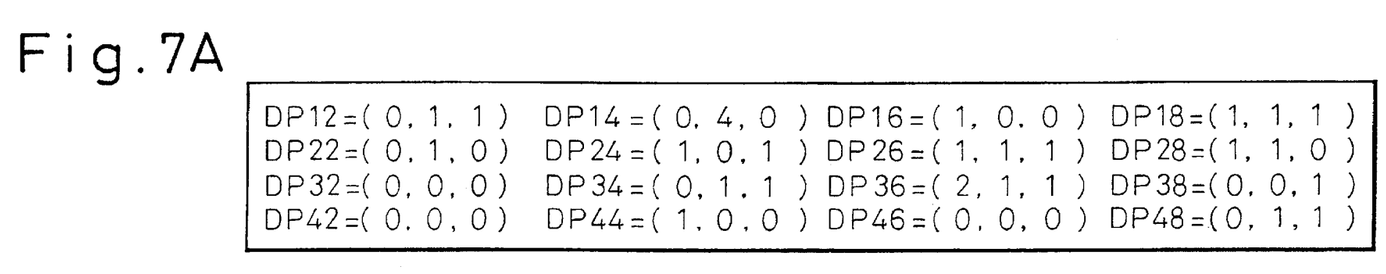
FIGS. 7A and 7B are diagrams showing how image data is processed by the image data compression process according to the second embodiment.
Figure 7B:
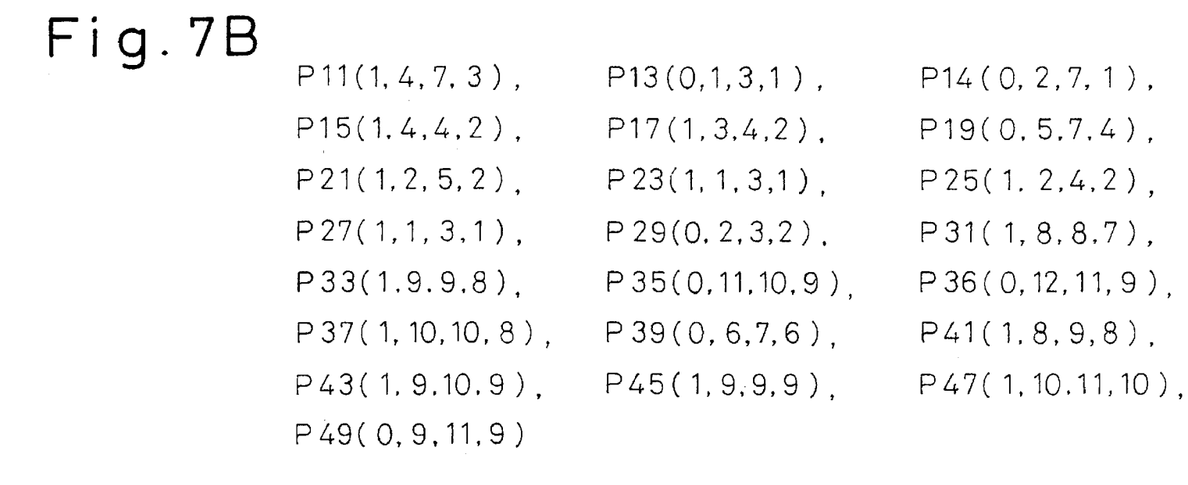

FIG. 6 is a flowchart illustrating an image data compression process according to the second embodiment. The description below is based on the pixel data shown in FIG. 3A. FIGS. 7A and 7B are diagrams showing the pixel data in the process of image data compression.

The register x indicates the row to be processed in the pixel array shown in FIG. 3A, and the register y indicates the column to be processed in the pixel array shown in FIG. 3A. In step 301, "1" is placed in the register x, and in step 302, "2" is placed in the register y. "2" is placed in the register y because the data to be deleted are limited to the data in the even-numbered columns, and because the decision as to whether to delete or not is made only for the data in the even-numbered columns.

In step 303, the xth-row, yth-column pixel data P(x, y) is read along with the pixel data P(x, y-1) and P(x, y+1) adjacent on both sides of it.

In step 304, the absolute value of the difference between the actual value of the xth-row, yth-column pixel data P(x, y) and the predicted value of the same based on the adjacent pixel data P(x, y-1) and P(x, y+1), is calculated for each of the color components, R, G, and B. More specifically, when the R, G, and B components of the pixel data P(x, y) are denoted by R(x, y), G(x, y), and B(x, y), respectively, then the differences, DR(x, y), DG(x, y), and DB(x, y), between the actual pixel data and the predicted pixel data for the R, G, and B components, are expressed by the following equations which are solved to obtain DR(x, y), DG(x, y), and DB(x, y).

$$DR(x, y) = (R(x, y-1) + R(x, y+1))/2 - R(x, y)$$

$$DG(x, y) = (G(x, y-1) + G(x, y+1))/2 - G(x, y)$$

$$DB(x, y) = (B(x, y-1) + B(x, y+1))/2 - B(x, y)$$

FIG. 7A shows the thus calculated differences from the predicted values of the pixel data in the even-numbered columns. In calculating the values, fractions less than 1 are discarded.

In step 304, it is determined whether the absolute values of the above DR(x, y), DG(x, y), and DB(x, y) are all within the reference value. If they are all within the reference value, it means that the difference between the actual pixel data and the predicted value based on the adjacent pixel data on both sides of it is small, that is, the pixel data in the even-numbered line in question can be deleted, since it can be reconstructed with sufficient accuracy. The operation now proceeds to step 306. If any one of DR(x, y), DG(x, y), and DB(x, y) is greater than the reference value, it is decided not to delete the pixel data, since it may not be possible to reconstruct the data with sufficient accuracy. The operation then proceeds to step 307. In this example, the reference value is set at 1.

In step 306, an index "1" is appended to the immediately preceding pixel data P(x, y-1) and, in the next step 308, the pixel data P(x, y-1) alone is stored in memory. On the other hand, in step 307, an index "0" is appended to the immediately preceding pixel data P(x, y-1), and in the next step 309, the pixel data P(x, y-1) is stored in memory along with the pixel data P(x, y) in the even-numbered column. The index indicates that the immediately following pixel data has not been deleted, while the index "1" indicates that the immediately following pixel data has been deleted.

The steps 308 and 309 are followed by step 310 where the value of the register y is incremented by 2. In step 311, a decision is made as to whether the value of the register y has exceeded the final column number; if the result is NO, the operation returns to step 303. In the above procedure, the pixel data in the even-numbered columns in the xth row are sequentially examined to determine whether the data can be deleted or not. The not-to-be-deleted pixel data in the even-numbered columns are stored in memory along with the pixel data in the odd-numbered columns, except one, in the final column.

In step 312, an index "0" is appended to the pixel data in the final odd-numbered column in the xth row, and the pixel data is stored in memory.

In step 313, the value of the register x is incremented by 1, and in step 314, a decision is made as to whether the value of the register x has exceeded the final row number; if the result is NO, the operation returns to step 302 to repeat the above procedure until the final row number is reached.

FIG. 7B is a diagram showing the pixel data stored in memory as a result of the above data compression processing. The first element in each pixel data is the index. It can be seen that when pixel data in a certain even-numbered column is held in memory, the index is set to "0" for the pixel data in that even-numbered column as well as for the pixel data in the immediately preceding odd-numbered column, and that the index is also set to "0" for the pixel data in the final column. This shows that the pixel data immediately following the pixel data having an index "0" need not be generated by interpolation.

Figure 8:
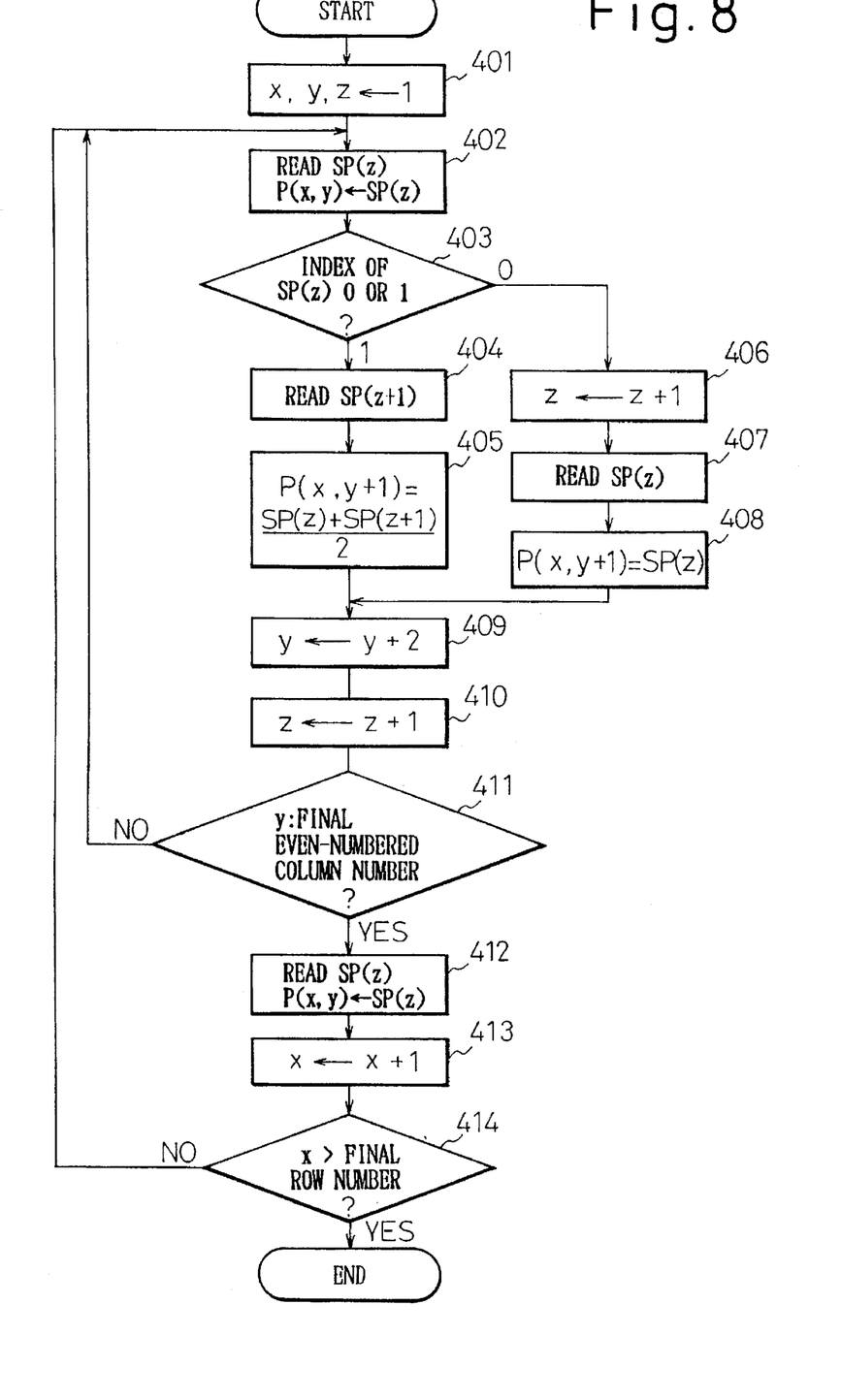
FIG. 8 is a flowchart illustrating a procedure for reproducing the image data from the data compressed by the image data compression process in FIG. 5 according to the second embodiment.

FIG. 8 is a flowchart illustrating a procedure for reproducing the image data from the data compressed by the above process according to the second embodiment.

In the illustrated process of reproduction, the registers x and y indicate the row and columns in the pixel array, as in the above-described example. The register z indicates the position at which the stored pixel data is to be read out. In step 401, "1" is placed in the registers x, y, z.

In step 402, the first stored pixel data SP (z) is read out and taken as the reproduced pixel data P (x, y).

In step 403, it is determined whether the index of SP (z) is "0" or "1".

If the index is "1", it means that the immediately following pixel data needs to be reconstructed by interpolation; therefore, in step 404, the next stored pixel data SP (z+1) is read out and, in step 405, the mean of the stored pixel data SP (z) and SP (z+1) is calculated for each of R, G, and B, to obtain the pixel data P (x, y+1).

If the index is "0", the immediately following pixel data is reproduced without using interpolation; therefore, in step 406, the value of the register z is incremented by 1 and, in step 407, the stored pixel data SP (z) is read out. In the next step 408, the stored pixel data SP (z) is taken as the pixel data P (x, y+1).

As described above, in the case of reconstructing pixel data by interpolation from adjacent pixel data, the value of the register z remains unchanged; on the other hand, in the case of reproducing pixel data without using interpolation but just by reading the next pixel data, the value of the register z is incremented by 1.

In step 409, the value of the register y is incremented by 2, and in step 410, the value of the register z is incremented by 1, and in step 412, the stored pixel data SP (z) is read out and taken as the final-column pixel data P (x, y).

In the next step 411, a decision is made as to whether the value of the register y has become equal to the final even-numbered column number; if the result is NO, the operation returns to step 402.

In step 413, the value of the register x is incremented by 1 and, in step 414, a decision is made as to whether the value of the register x has exceeded the final row number; if the result is NO, the operation returns to step 402 to repeat the above procedure until all the pixels are reproduced.

In the above-described two embodiments, the method of reproducing deleted pixel data used in one embodiment may be combined with the method of appending deleted-position information used in the other embodiment. It is also possible to employ other methods than those described above; for example, the ratio of the data to be deleted may be changed. Furthermore, in any of the above embodiments, the decision whether to delete or not delete pixel data is made based on whether the difference from the pixel data adjacent on one side or on both sides of it lies within a reference value for all of R, G, and B; however, other criteria may be used. For example, the decision may be made based on whether the sum of the differences for R, G, and B is smaller than the reference value, or on whether the sum of the squares of the differences for R, G, and B is smaller than the reference value. With such criteria, the luminance of an image can be reproduced satisfactorily.

We claim:

1. An image data compression method, comprising:

a reading step in which an image is read as plural pixel data;

a prediction error calculating step in which a prediction error is calculated that represents a difference between actual color value pixel data, of a pixel in question, and a predicted color value thereof as predicted by a prescribed prediction method from the pixel data of a pixel adjacent to the pixel in question;

an area-type classifying step in which the pixel data, of the entire image area, is classified into one of an abrupt color change area type in which said prediction error is large and a nonabrupt color change area type in which said prediction error is small;

a deleting step in which some of the pixel data, classified in said area classifying step as said nonabrupt color change area type, are deleted and remaining pixel data are maintained for storage; and a deleted-position information appending step in which deleted-position information, that indicates the position of a pixel whose data has been deleted, is appended to the remaining pixel data for storage therewith.

2. An image data compression method according to claim 1, wherein in said prediction error calculating step, the difference of the color value pixel data between a pixel in question and a pixel adjacent one side thereof is detected as said prediction error, on a pixel-by-pixel basis for all pixels of the image.

3. An image data compression method according to claim 2, wherein said color value pixel data comprises three color separation pixel data based on the RGB color coordinate system, and the pixel in question is determined as belonging to a nonabrupt color change area when said prediction error is smaller than a reference value for all the three colors.

4. An image data compression method according to claim 2, wherein the color value pixel data comprises three color separation pixel data based on the RGB color coordinate system, and the pixel in question is determined as belonging to a nonabrupt color change area when the sum of said prediction errors for the three respective colors is smaller than a reference value.

5. An image data compression method according to claim 2, wherein the color value pixel data comprises three color separation pixel data based on the RGB color coordinate system, and the pixel in question is determined as belonging to a nonabrupt color change area when the sum of the squares of said prediction errors for the three respective colors is smaller than a reference value.

6. An image data compression method according to claim 1 wherein, in said prediction error calculating step, the difference between the color value pixel data of a pixel in question and the mean of the respective color value pixel data of first and second pixels adjacent corresponding, opposite sides thereof is detected as said prediction error, on a pixel-by-pixel basis.

7. An image data compression method according to claim 6, wherein said color value pixel data comprises three color separation data based on the RGB color coordinate system, and the pixel in question is determined as belonging to a nonabrupt color change area when said prediction error is smaller than a reference value for all the three colors.

8. An image data compression method according to claim 6, wherein said color value pixel data comprises three color separation data based on the RGB color coordinate system, and the pixel in question is determined as belonging to a nonabrupt color change area when the sum of said prediction errors for the three respective colors is smaller than a reference value.

9. An image data compression method according to claim 6, wherein said color value pixel data comprises three color separation data based on the RGB color coordinate system, and the pixel in question is determined as belonging to a nonabrupt color change area when the sum of the squares of said prediction errors for the three respective colors is smaller than a reference value.

10. An image data compression method according to claim 1, wherein said deleting step is performed only on the pixel data in predesignated columns of pixels, as defined in the image and read therefrom as plural pixel data in the reading step, and said data prediction error calculating step and said area classifying step are performed only on the color value pixel data in said predesignated columns on which said deleting step is to be performed.

11. An image data compression method according to claim 1, wherein the information appended in said deleted-position information appending step is stored in the form of a table in which all the pixels in the image area are mapped in a relationship corresponding to the image and which indicates pixel positions at which the pixel data has been deleted.

12. An image data compression method according to claim 1, wherein the information appended in said deleted-position information appending step comprises an index, the index being appended to the remaining pixel data and indicating whether the color value pixel data of a pixel adjacent to a pixel in question has been deleted or not.

13. An image data processing device comprising:
  input means for reading an image as plural pixel data;
  prediction error calculating means for calculating a prediction error which represents a difference between color value pixel data, of a pixel in question, and a predicted color value thereof as predicted by a prescribed prediction method from the pixel data of a pixel adjacent to the pixel in question;
  area-type classifying means for classifying the pixel data of the entire image area into an abrupt color change area type in which said prediction error is large and a nonabrupt color change area type in which said prediction error is small;
  deleting means for deleting some of the pixel data classified by said area classifying means as said nonabrupt color change area type, remaining pixel data being maintained for storage; and
  deleted-position information appending means for appending deleted-position information, that indicates the position of a pixel whose data has been deleted, to remaining pixel data for storage therewith.

14. An image data processing device according to claim 13, further comprising:
  storage means for storing the remaining pixel data along with said appended deleted-position information; and
  reproducing means for reproducing the image by reading said image data stored in said storage means along with said deleted-position information.

15. An image data processing device according to claim 13, wherein said prediction error calculating means calculates the difference, in color value pixel data, between the pixel in question and the pixel adjacent to the pixel in question, as said prediction error, on a pixel-by-pixel basis for the entire image area.

16. An image data processing device according to claim 15, wherein said pixel data consists of three color separation data based on the RGB color coordinate system, and said classifying means determines that the pixel in question belongs to a nonabrupt color change area when said prediction error is smaller than a reference value for all the three colors.

17. An image data compression method according to claim 15, wherein said pixel data consists of three color separation data based on the RGB color coordinate system, and said classifying means determines that the pixel in question belongs to a nonabrupt color change area when the sum of said prediction errors for the three respective colors is smaller than a reference value.

18. An image data compression method according to claim 15, wherein said pixel data consists of three color separation data based on the RGB color coordinate system, and said classifying means determines that the pixel in question belongs to a nonabrupt color change area when the sum of the squares of said prediction errors for the three respective colors is smaller than a reference value.

19. An image data processing device according to claim 13, wherein said prediction error calculating means detects, as said prediction error, the difference between the pixel data of the pixel in question and the mean of the pixel data of two pixels respectively adjacent opposite sides of the pixel in question.

20. An image data processing device according to claim 19, wherein said pixel data consists of three color separation data based on the RGB color coordinate system, and said classifying means determines that the pixel in question belongs to a nonabrupt color change area when said prediction error is smaller than a reference value for all the three colors.

21. An image data compression method according to claim 19, wherein said pixel data consists of three color separation data based on the RGB color coordinate system, and said classifying means determines that the pixel in question belongs to a nonabrupt color change area when the sum of said prediction errors for the three respective colors is smaller than a reference value.

22. An image data compression method according to claim 19, wherein said pixel data consists of three color separation data based on the RGB color coordinate system, and said classifying means determines that the pixel in question belongs to a nonabrupt color change area when the sum of the squares of said prediction errors for the three respective colors is smaller than a reference value.

23. An image data processing device according to claim 13, wherein said deleting means deletes only pixel data in predesignated columns of pixels, as defined in the image and read therefrom as plural pixel data by the input means, and said prediction error calculating means and said area classifying means perform the operations of prediction error calculation and area classification only on the pixel data in the columns on which the operation of pixel data deletion is to be performed.

24. An image data processing device according to claim 13, wherein said deleted-position information appending means appends the deleted-position information in the form of a table in which all the pixels in the image are mapped in a relationship corresponding to the image and which indicates pixel positions at which the pixel data has been deleted.

25. An image data processing device according to claim 13, wherein said deleted-position information appending means appends, to the remaining pixel data, an index that indicates whether the pixel data of a pixel adjacent thereto has been deleted or not.

* * * * *